(12) United States Patent
Fang

(10) Patent No.: US 7,058,255 B1
(45) Date of Patent: Jun. 6, 2006

(54) WEDGE PRISM OPTICAL SWITCHES

(75) Inventor: Zuyun Fang, Las Vegas, NV (US)

(73) Assignee: OptiWorks, Inc., Fremont, CA (US)

( * ) Notice: Subject to any disclaimer, the term of this patent is extended or adjusted under 35 U.S.C. 154(b) by 0 days.

(21) Appl. No.: 11/087,435

(22) Filed: Mar. 23, 2005

(51) Int. Cl.
G02B 6/35 (2006.01)
G02B 6/34 (2006.01)

(52) U.S. Cl. .............................. 385/22; 385/16; 385/36

(58) Field of Classification Search ............ 385/16–22, 385/36; 359/196, 209, 211
See application file for complete search history.

(56) References Cited

U.S. PATENT DOCUMENTS

| | | | |
|---|---|---|---|
| 5,867,617 A | 2/1999 | Pan et al. ...................... | 385/18 |
| 6,215,919 B1 | 4/2001 | Li et al. ........................ | 385/16 |
| 6,263,132 B1 * | 7/2001 | Shahid ......................... | 385/31 |
| 6,415,067 B1 | 7/2002 | Copner et al. ................. | 385/16 |
| 6,477,289 B1 | 11/2002 | Li ................................ | 385/16 |
| 6,546,162 B1 | 4/2003 | Copner et al. ................. | 385/16 |
| 6,549,700 B1 | 4/2003 | Sweatt et al. .................. | 385/25 |
| 6,574,385 B1 | 6/2003 | Irwin ............................ | 385/16 |
| 6,823,102 B1 * | 11/2004 | Zhao et al. .................... | 385/22 |
| 6,970,615 B1 * | 11/2005 | Fang et al. .................... | 385/16 |
| 2002/0057868 A1 * | 5/2002 | Wu et al. ...................... | 385/24 |

FOREIGN PATENT DOCUMENTS

JP 01154017 A * 6/1989

OTHER PUBLICATIONS

Piezosystem Jena, "Optical Fiber Switches," 7 pages, available from Piezosystem Jena before Mar. 23, 2005, available online on Jun. 25, 2005 at http://www.piezojena.com/files.php4?dl_mg_id=134&file=dl_mg_1110279892.pdf.

* cited by examiner

Primary Examiner—Sarah Song
(74) Attorney, Agent, or Firm—Law Office of Andrei D Popovici, P.C.

(57) ABSTRACT

In some embodiments, an optical switch includes multiple individually-retractable wedge switching prisms stacked in a longitudinal channel, corresponding plural transverse-translation rhomboid prisms extending transversely away from the longitudinal channel, and corresponding plural fiber collimators oriented longitudinally and aligned along a transverse line on both sides of the longitudinal channel. To switch light to a selected fiber collimator, its corresponding wedge switching prism is inserted in the longitudinal channel to deflect light to a corresponding transverse-translation prism and on to the selected fiber collimator; the other switching prisms are retracted from the channel. In some embodiments, longitudinally-adjacent switching prisms are oriented in opposite directions. A reverse-deflection wedge prism can be provided between each switching prism and its corresponding transverse-translation prism. The described preferred systems allow improved system stability, as well as ease of manufacturing and alignment.

20 Claims, 8 Drawing Sheets

FIG. 2-A 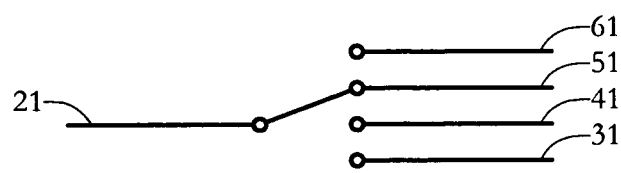
FIG. 2-B 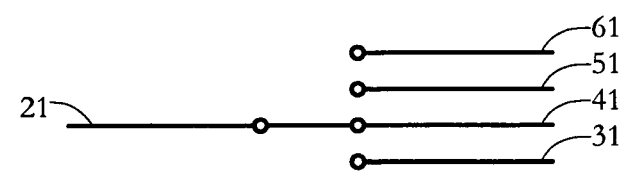
FIG. 2-C 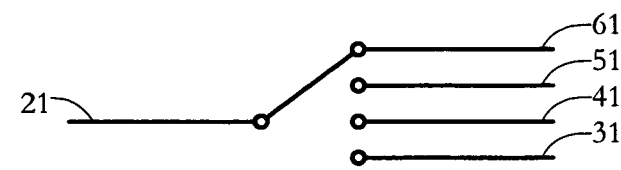
FIG. 2-D 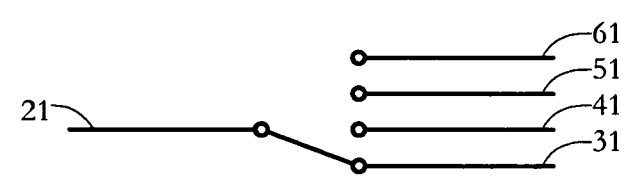
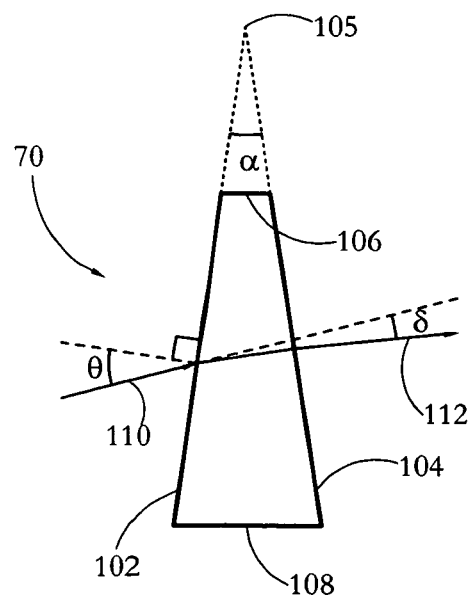
FIG. 3-A
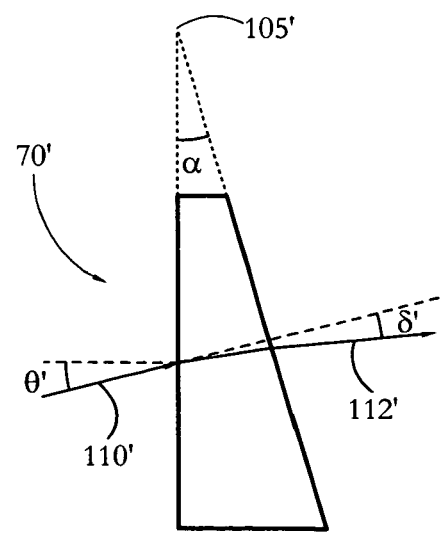
FIG. 3-B

WEDGE PRISM OPTICAL SWITCHES

BACKGROUND

The invention relates to optical system and methods, and in particular to optical switches for use in optical systems such as fiber optic networks.

Optical switches are useful for a variety of applications, including fiber optic communications. In one design approach, optomechanical components are used to direct light from a desired optical input to a desired optical output. Conventional optomechanical switches include switches employing moving prisms and switches employing moving fibers, among others.

If insertion losses are to be maintained within an acceptable range, the various components of an optical switch ordinarily need to be precisely aligned relative to each other. Precise alignment requirements can significantly increase manufacturing costs, reduce manufacturing yields, and constrain the temperature ranges and vibration intensities to which the switches can be subjected.

SUMMARY

According to one aspect, an optical switch includes a first optical port, a plurality of second optical ports, and a plurality of switching units each capable of selectively optically coupling the first optical port to a selected second optical port. A switching unit corresponding to a selected second optical port includes a fixed, transverse-translation rhomboid prism, and an individually-movable wedge switching prism movable between a first switching position situated in a generally-longitudinal optical path, and a retracted second switching position situated outside the longitudinal optical path. The wedge switching prism in the first switching position deflects light traveling generally along the longitudinal optical path to optically couple the first optical port to the selected second optical port through the transverse-translation prism. The wedge switching prism in the second switching position does not optically couple the first optical port to the selected second optical port.

According to another aspect, an optical switch comprises a first optical port, a second optical port, a third optical port, a first fixed transverse-translation reflector, a second fixed transverse-translation reflector, a first wedge switching prism movable between a first switching position and a second switching position, and a second wedge switching prism movable between a third switching position and a fourth switching position. The first wedge switching prism in the first switching position deflects generally-longitudinal light to optically couple the first optical port to the second optical port through the first transverse-translation reflector. The first wedge switching prism in the second switching position does not optically couple the first optical port to the second optical port. The second wedge switching prism in the third switching position deflects generally-longitudinal light to optically couple the first optical port to the third optical port through the second transverse-translation reflector. The second wedge switching prism in the fourth switching position does not optically couple the first optical port to the third optical port.

According to another aspect, an optical switching method includes inserting a first wedge switching prism into a longitudinal light path to establish an optical connection between a first optical port and a second optical port through a first fixed transverse-translation reflector facing the second optical port; and removing the first wedge switching prism from the longitudinal path and inserting a second wedge switching prism into the longitudinal light path to establish an optical connection between the first optical port and a third optical port through a second fixed transverse-translation reflector facing the third optical port.

BRIEF DESCRIPTION OF THE DRAWINGS

The foregoing aspects and advantages of the present invention will become better understood upon reading the following detailed description and upon reference to the drawings where:

FIGS. 2-A–D show optical paths corresponding to four switching states of the optical switch of FIG. 1, according to some embodiments of the present invention.

FIGS. 3-A–B illustrate a symmetric and an asymmetric wedge prism, respectively, according to some embodiments of the present invention.

DETAILED DESCRIPTION OF PREFERRED EMBODIMENTS

In the following description, it is understood that any recitation of an element refers to at least one element. A set of elements includes one or more elements. A plurality of elements includes two or more elements. A rhomboid prism is a prism having a cross-section shaped as an oblique-angled parallelogram with equal opposite sides, and equal or non-equal adjacent sides. The statement that a first deflection is opposite in sign to a second deflection means that the first deflection is clockwise and the second deflection is counterclockwise with respect to a pre-deflection direction of light travel, or that the first deflection is counterclockwise and the second deflection is clockwise. For simplicity, the description below focuses primarily on 1×N switches having 1 input and N outputs, but the described configurations are optically reversible to yield switches with 1 output and N inputs, as well as extendible to N×M configurations. Using a wedge prism to deflect generally longitudinal light encompasses both deflecting light incident precisely along a longitudinal central axis (e.g. in a configuration with 1 input and N outputs), as well as deflecting incident oblique, generally-longitudinal light onto the central longitudinal central axis (e.g. in a configuration with N inputs and 1 output). Retracting a switching prism encompasses withdrawing the switching prism by any trajectory, including without limitation a linear trajectory or an arcuate in-plane or out-of-plane trajectory. The term transverse encompasses directions that are transverse to a longitudinal direction, including a direction perpendicular to the longitudinal direction. A transverse-translation reflector is a reflector that receives generally-longitudinal incoming light and outputs generally-longitudinal light that is transversely offset relative to the incoming light.

Figure 1:
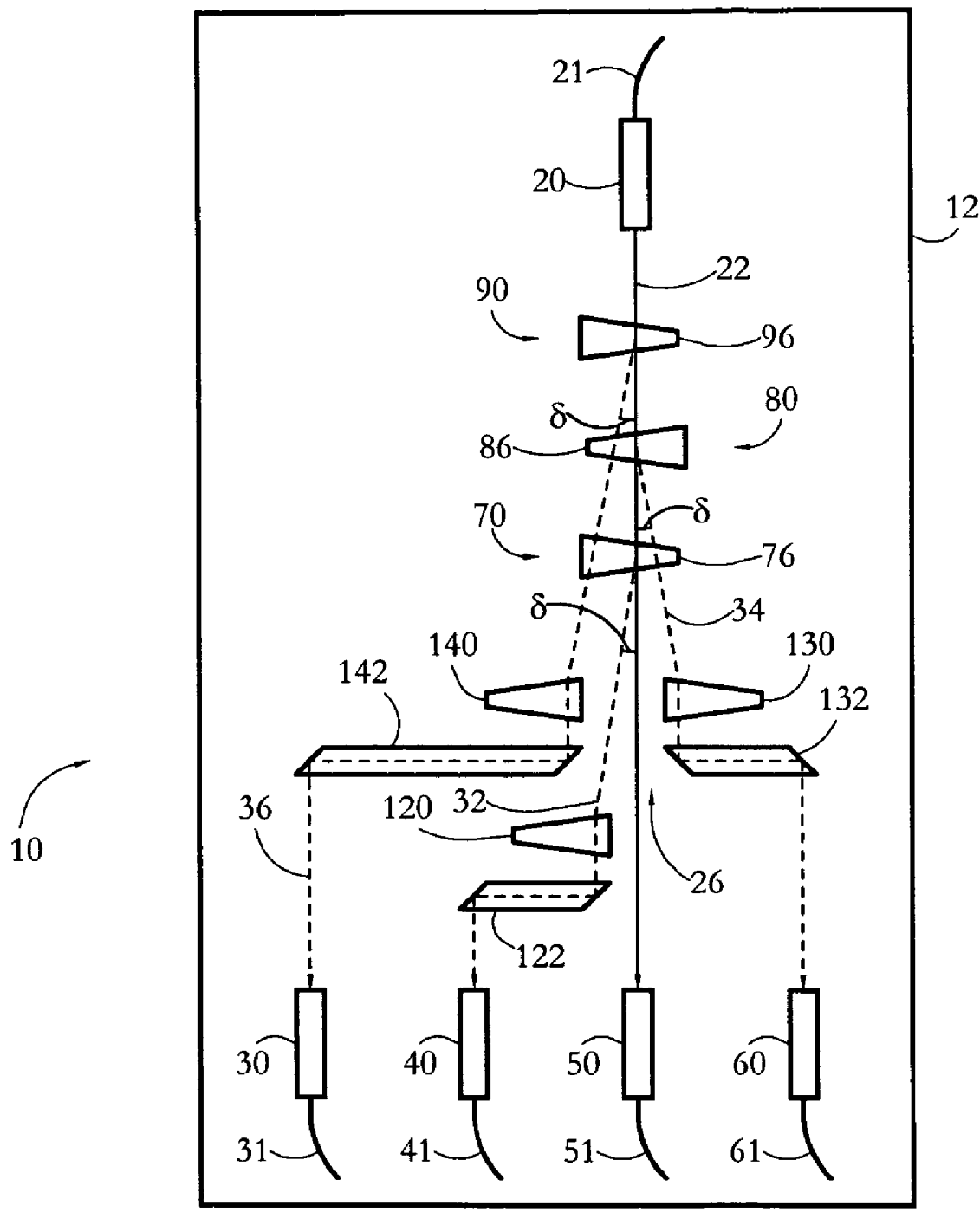
FIG. 1 shows an optical switch comprising multiple switching units each corresponding to an optical output port, each switching unit including a transverse-translation rhomboid prism and a retractable wedge switching prism, according to some embodiments of the present invention.

FIG. 1 is a schematic diagram of an exemplary 1×N optical switch 10 according to some embodiments of the present invention. Optical switch 10 has a plurality of input and output optical ports, including a first input/output fiber collimator 20 and a plurality of output/input collimators 30, 40, 50, 60, respectively. Each collimator 20, 30, 40, 50, 60 is mechanically and optically coupled to a corresponding optical fiber 21, 31, 41, 51, 61, respectively. The optical axes of collimators 20–60 are generally parallel and longitudinal. Collimator 20 faces a direction opposite that of collimators 30, 40, 50, 60. Collimators 30, 40, 50, 60 are aligned and face the same direction, with their optical axes offset by a set transverse distance. The inter-collimator separation distance is in general larger than the diameter of the collimators. Collimators 20 and 50 are optically aligned facing each other along a common optical axis, and fixed on a switch base plate 12.

In a first, default switching state of switch 10, optical fiber 21 is optically coupled to optical fiber 51. Input light incident through fiber 21 becomes a collimated beam traveling along an optical path 22. Optical path 22 coincides with the optical axes of collimators 20, 50, and forms a central longitudinal optical axis of switch 10. The collimated light beam traveling along optical path 22 enters collimator 50 and outputs through fiber 51 without deflection by the switching components of switch 10. The optical path is reversible: light entering through fiber 51 exits through fiber 21.

FIGS. 2-A–D show the optical paths corresponding to four switching states of optical switch 10, according to some embodiments of the present invention. In the switching states illustrated in FIGS. 2-A–D, optical fiber 21 is selectively connected to only one of fibers 51, 41, 61 and 31, respectively.

As shown in FIG. 1, switch 10 includes three switching units capable of selectively optically coupling input collimator 20 to one of the collimators 30, 40, 50, 60. Each switching unit includes a wedge switching prism, a reverse-deflection wedge prism, and a transverse-translation rhomboid prism, as described below. Three individually-movable wedge switching prisms 70, 80, 90 are stacked in a longitudinal column space (or pathway) 26 centered along optical path 22. Each wedge prism 70, 80, 90 is attached to a mechanical switching device that moves the prism in and out the region between collimator 20 and collimator 50. The switching device may be an electromagnetic device such as an electric relay.

When optical switch 10 is in a first switching state, all wedge prisms 70, 80, 90 are situated out of the optical path 22. In other switching states, one of the wedge prisms 70, 80, 90 is situated in the optical path 22, with light passing through its transmissive side surfaces, while the other switching prisms are retracted. Wedge prisms 70, 80, 90 are sequentially arranged along optical path 22, with their top and bottom surfaces facing a generally transverse direction, alternatively in generally opposite orientations. In FIG. 1, a top surface 76 of wedge prism 70 faces the right side, a top surface 86 of wedge prism 80 faces the left side, and a top surface 96 of wedge prism 90 faces the right side.

In a second switching state, switch 10 establishes an optical connection between fiber 21 and fiber 41. In the second switching state, wedge prism 70 is inserted in the optical path 22, while wedge prisms 80, 90 are out of the optical path 22. An input longitudinal light beam traveling along optical path 22 enters prism 70 through a transmissive side surface 72 and leaves prism 70 through an opposite transmissive side surface 74. A generally-longitudinal deflected light beam 32 forms a deflection angle $\delta$ with respect to the input light beam along optical path 22. Light beam 32 is deflected clockwise by prism 70. In some embodiments, the deflection angle $\delta$ is less than 15°, in particular less than 10°, for example about 5–6° or less. Light beam 32 then enters a fixed-position, reverse-deflection wedge prism 120 located adjacent to optical path 22. Wedge prism 120 has a wedge angle $\alpha$ generally identical to the wedge angle of movable prism 70. Wedge prism 120 is located opposite top surface 76 relative to optical path 22, and is in an orientation opposite to that of prism 70. Wedge prism 120 is separated from wedge prism 70 by a minimum distance d chosen so that beam 32 is sufficiently separated from a beam traveling along optical path 22 at the location of prism 120. The inter-beam separation d sin $\delta$ is preferably larger than the light beam's diameter plus a safety margin, such that light beam 32 can fully pass through wedge prism 120 without clipping, while light passing along optical path 22 is not blocked by prism 120.

Wedge prism 120 deflects light beam 32 by a deflection angle $\delta$ opposite in sign to the deflection angle imparted by switching prism 70 (counterclockwise with respect to optical path 22) so that light beam 32 is parallel to optical path 22 after passage through wedge prism 120. Beam 32 is then offset transversely by a fixed-position rhomboid prism 122. Prism 122 has a 45°-parallelogram shape, with two parallel, generally-transverse transmissive surfaces perpendicular to light beam 32, and two reflective side surfaces forming a 45° angle with the transmissive surfaces. The transverse extent of the transmissive surfaces is determined according to the transverse position of collimator 40. A distal transverse end of prism 122 faces collimator 49, while a proximal transverse end is generally adjacent to optical path 22. Within prism 122, light beam 32 passes through a first transmissive surface, is reflected by a first side surface, travels across the prism, is further reflected by the other side surface and leaves prism 122 through the other transmissive surface. The section of beam 32 exiting prism 122 is parallel to the beam section entering prism 122, and is offset by a transverse distance equal to the length of prism 122. Light beam 32 then enters the aligned collimator 40 and is output through fiber 41. The optical path described above is reversible: light can be input through fiber 41 and output through fiber 21.

In a third switching state of optical switch 10, wedge prism 80 is inserted in optical path 22, while wedge prisms 70, 90 are out of optical path 22 and do not establish optical connections between collimator 20 collimators 30, 40, respectively. A light beam 34 initially traveling along optical path 22 is deflected by prism 80 by a deflection angle $\delta$, counterclockwise with respect to optical path 22, and then deflected by a fixed, reverse-deflection wedge prism 130 by an identical deflection angle of opposite sign, clockwise with respect to optical path 22. A distance d' between wedge prism 130 and wedge prism 80 and the corresponding inter-beam separation d' sin $\delta$ are chosen such that light can pass through wedge prism 130 without clipping, while light traveling along optical path 22 is not obstructed by prism 130. After passage through wedge prism 130, an incident light beam is transversely offset by a fixed rhomboid prism 132, enters collimator 60, and outputs through fiber 61.

In a fourth switching state of optical switch 10, wedge prism 90 is inserted in optical path 22, while wedge prisms 70, 80 are out of optical path 22. A light beam 36 initially traveling along optical path 22 is deflected by prism 90 by a deflection angle δ, clockwise with respect to optical path 22, and then deflected by a fixed, reverse-deflection wedge prism 140 by an identical deflection angle of opposite sign, counterclockwise with respect to optical path 22. A distance d" between wedge prism 140 and wedge prism 90 and the corresponding inter-beam separation d" sin δ are chosen such that light can pass through wedge prism 140 without clipping, while light traveling along optical path 22 is not obstructed by prism 140. After passage through wedge prism 140, an incident light beam is transversely offset by a fixed rhomboid prism 142, enters collimator 30, and outputs through fiber 31.

Preferably, the two transmissive surfaces of each rhomboid prism 122, 132, 142 are anti-reflection (AR) coated. The reflective surfaces have cleanness and flatness characteristics of optical quality. The prism material is chosen according to its refractive index n. For total internal reflection inside a material of refractive index n, the incident angle θ with respect to the normal obeys the relation:

$$\sin \theta \geq 1/n. \quad [3]$$

For BK7, a borosilicate optical glass, the refractive index is n=1.5, and the minimum incident angle θ given by Eq. [3] is 41.8°.

As shown in FIG. 3-A, wedge prism 70 has two symmetrically-disposed transmissive side surfaces 102, 104, a top surface 106, and a bottom surface 108. Transmissive surfaces 102, 104 are preferably anti-reflection (AR) coated. The side surfaces 102, 104 cross at a point 105, and form a wedge angle α. An incident light beam 110 enters wedge prism 70 through side surface 102 and is deflected by prism 70. A deflected light beam 112 forms a deflection angle δ with respect to incident beam 110. Light beam 112 is deflected toward bottom surface 108.

The deflection angle δ formed between incident beam 110 and deflected beam 112 is given by $$\delta = \arcsin [\sin \alpha (n^2 - \sin^2 \theta)^{1/2} - \cos \alpha \sin \theta] + \theta - \alpha, \quad [1]$$

where α is the wedge angle, θ is the incident angle, and n is the refractive index of the wedge prism material. When α is a small angle, the deflection angle δ is relatively stable, and is relatively insensitive to variations in the incident angle θ.

A similar relationship between the deflection, incident and wedge angles can be observed for an asymmetric wedge prism 70' shown in FIG. 3-B. The wedge angle α is typically the most important parameter for a wedge prism; the geometric configuration of the wedge prism is less important. Prism 70' has a wedge angle α defined at a side surface crosspoint 105'. The incident angle formed between an incident beam 110' and the normal to the input side surface is denoted by θ', while the deflection angle formed between incident beam 110' and a deflected beam 112' is denoted by δ'.

Figure 4:
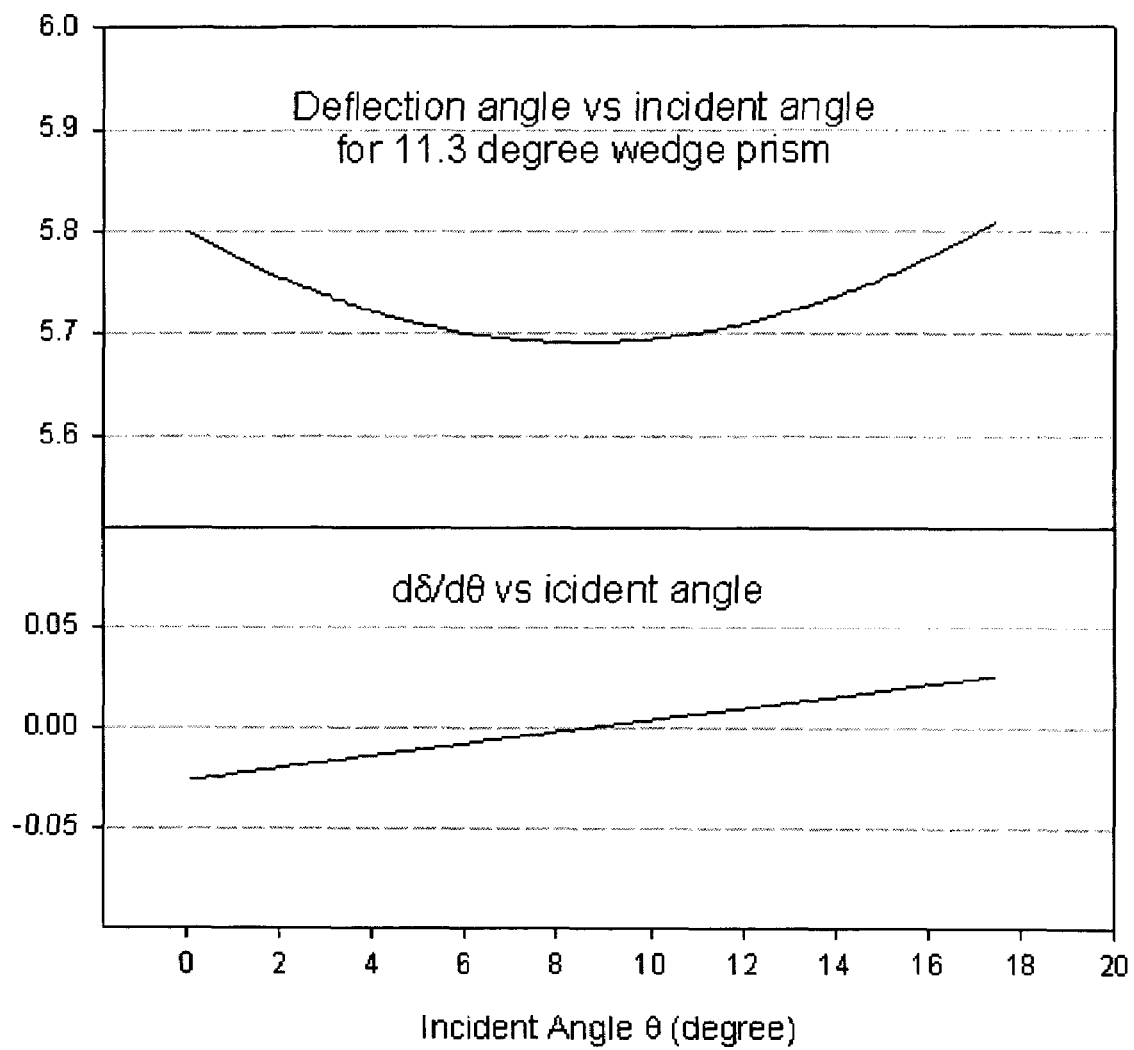
FIG. 4 shows computed data on the dependence of the deflection angle on the incident angle for an exemplary wedge prism, according to some embodiments of the present invention.

FIG. 4 shows data on the dependence of the deflection angle δ on the incident angle θ, for a wedge prism with α=11.3° and an index of refraction n of about 1.5. The data of FIG. 4 is computed according to Eq. [1]. When the incident angle θ varies between 0° and 18°, the deflection angle δ changes only between 5.7° and 5.8°, and the relative change rate dδ/dθ is within ±0.03. The relative insensitivity of the deflection angle to changes in the incident angle ensures a good stability of the output optical beam as well as a good repeatability of the switch, making a wedge prism such as the one described above an ideal choice for movable switching parts. The output beam stability is particularly improved for lower wedge angles α.

Figure 5:
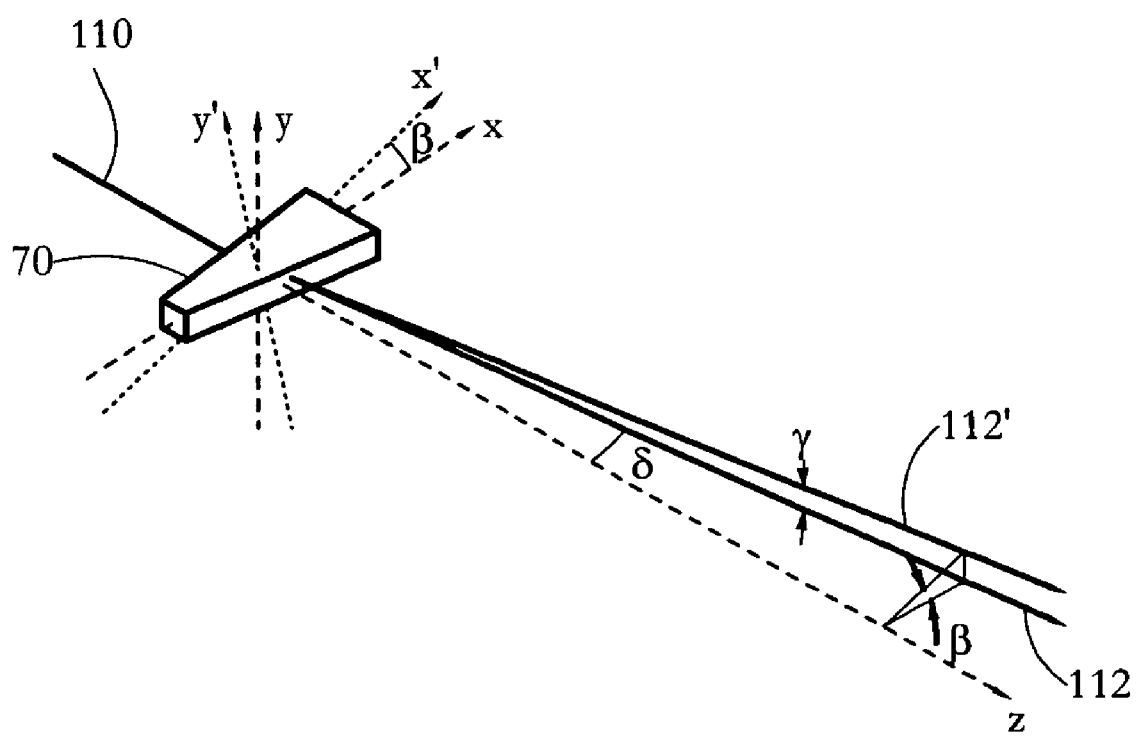
FIG. 5 illustrates the sensitivity of the deflection angle to changes in prism positioning for a wedge prism according to some embodiments of the present invention.

FIG. 5 illustrates the sensitivity of the deflection angle δ to changes in wedge prism positioning. In FIG. 5, an incident beam 110 enters wedge prism 70 along the z-axis. An output beam 112 is located in the z-x plane, and forms a deflection angle δ relative to the z-axis, inclined toward the positive x-direction. If wedge prism 70 is rotated about the z-axis by a small angle β, a resulting output beam 112' is no longer in the z-x plane. The plane containing output beam 112' and the z-axis is rotated by angle β about the z-axis. Such a rotation of prism 70 can be caused by a mechanical disturbance or some other reason. Output beam 112' forms a deviation angle γ relative to output beam 112. The deviation angle γ is $$\gamma = \beta \sin \delta. \quad [2]$$

Eq. [2] shows that reducing the deflection angle δ leads to a reduction in the sensitivity of the deviation γ to the rotation disturbance β. As an example, for γ=5.7°, Eq. [2] yields γ=0.1 β.

Figure 6:
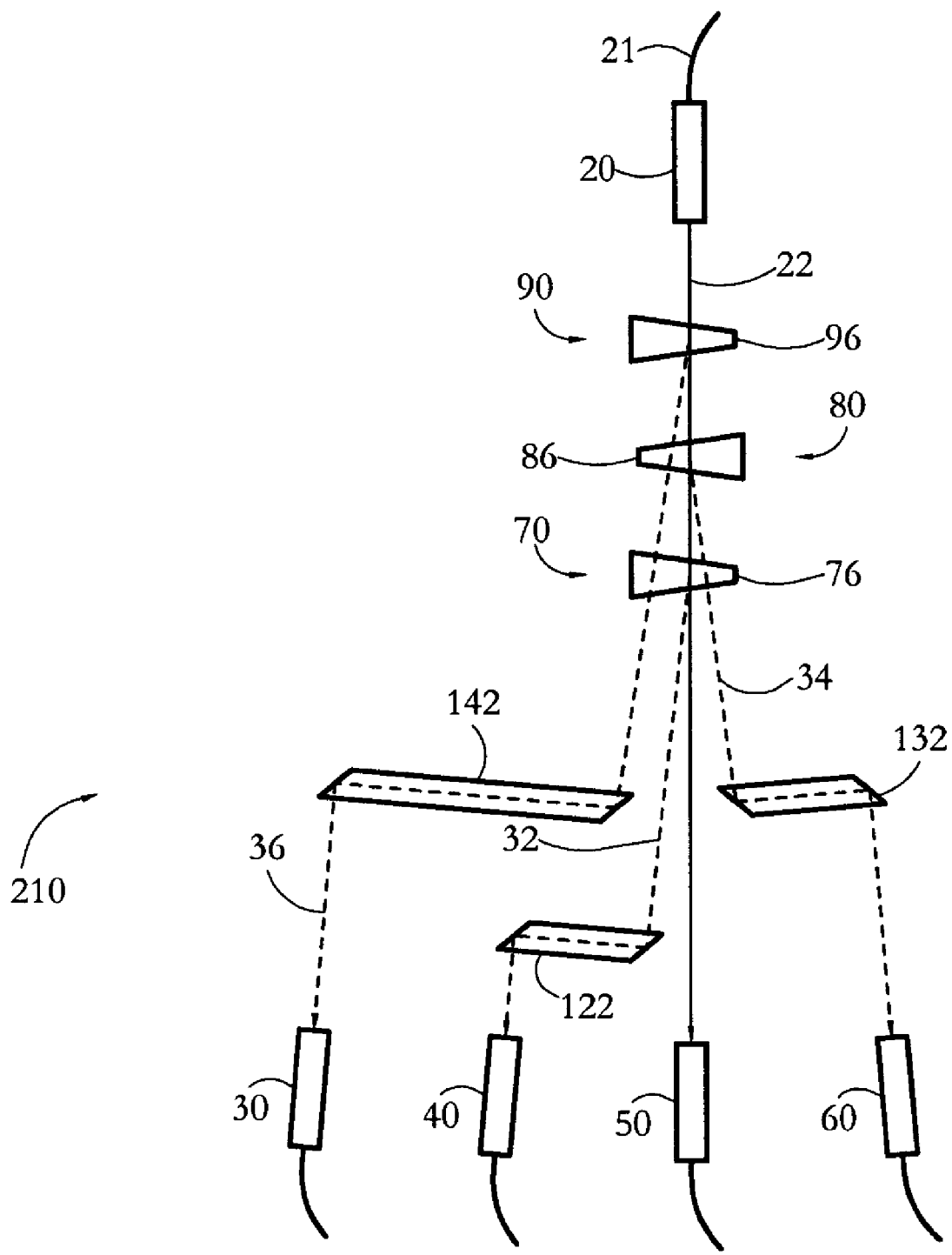
FIG. 6 shows an optical switch according to some embodiments of the present invention.

FIG. 6 shows a 1×4 optical switch 210 according to some embodiments of the present invention. Switch 210 differs from the switch 10 shown in FIG. 1 in that switch 210 does not include reverse rotation prisms (120, 130, 140 in FIG. 1), and the assemblies formed by collimators 30, 40, 60 and rhomboid prisms 142, 122, 132, respectively, are appropriately rotated with respect to the longitudinal direction defined by optical path 22. Rhomboid prisms 122, 132, 142 are arranged so that their corresponding incident light beams are generally normal to their respective prism transmissive input surfaces. The output beams translated by prisms 122, 132, 142 form a tilt angle δ with respect to the longitudinal direction defined by optical path 22. Accordingly, collimators 30, 40, 60 are oriented at an angle δ with respect to the longitudinal direction defined by optical path 22. The optical switch shown in FIG. 6 employs fewer optical parts than the one shown in FIG. 1. At the same time, the tilted output collimator positions may require appropriately designed and positioned collimator mounts to achieve desired levels of optical performance.

Figure 7:
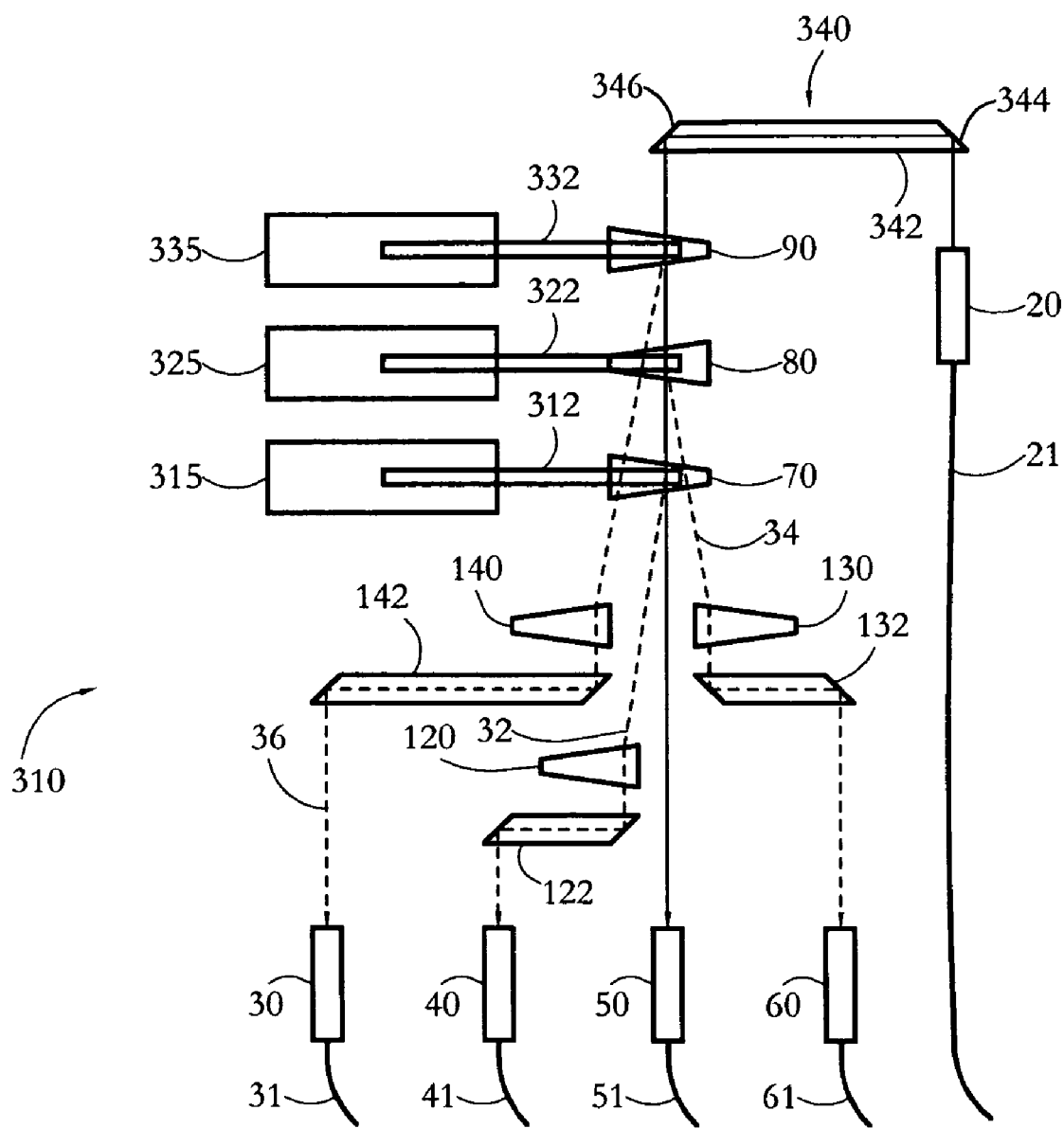
FIG. 7 shows an optical switch having all optical fibers exiting along one side of the switch, and all ports facing the same direction within the switch, according to some embodiments of the present invention.

FIG. 7 shows a 1×4 optical switch 310 according to some embodiments of the present invention. An input collimator 20 faces the same direction as collimators 30, 40, 50, 60 within switch 310. A 45° dovetail prism 340 having a trapezoidal in-plane cross-section faces collimator 20. A collimated light beam output by collimator 20 enters prism 340 through a front transmissive surface 342, is totally reflected by a reflective surface 344, travels transversely within prism 340, is again reflected by a reflective surface 346, and leaves prism 340 along a general longitudinal direction opposite to the direction of the input beam. Transmissive surface 342 is anti-reflection (AR) coated, while reflective surfaces 344, 346 have cleanness and flatness characteristics of optical quality. The output beam is received by one of collimators 30, 40, 50, 60, according to the switching state of switch 310. Three mechanical switching devices 315, 325, 335 coupled to transverse linearly movable arms 312, 322, 332 are used to linearly insert and retract movable prisms 70, 80, 90, respectively, in and out of the light beam path, along a linear transverse trajectory. Each prism 70, 80, 90 is mounted at the distal tips of a corresponding arm 312, 322, 332. The configuration of FIG. 7 allows placing all the switch optical fibers on one side of the switch.

Figure 8:
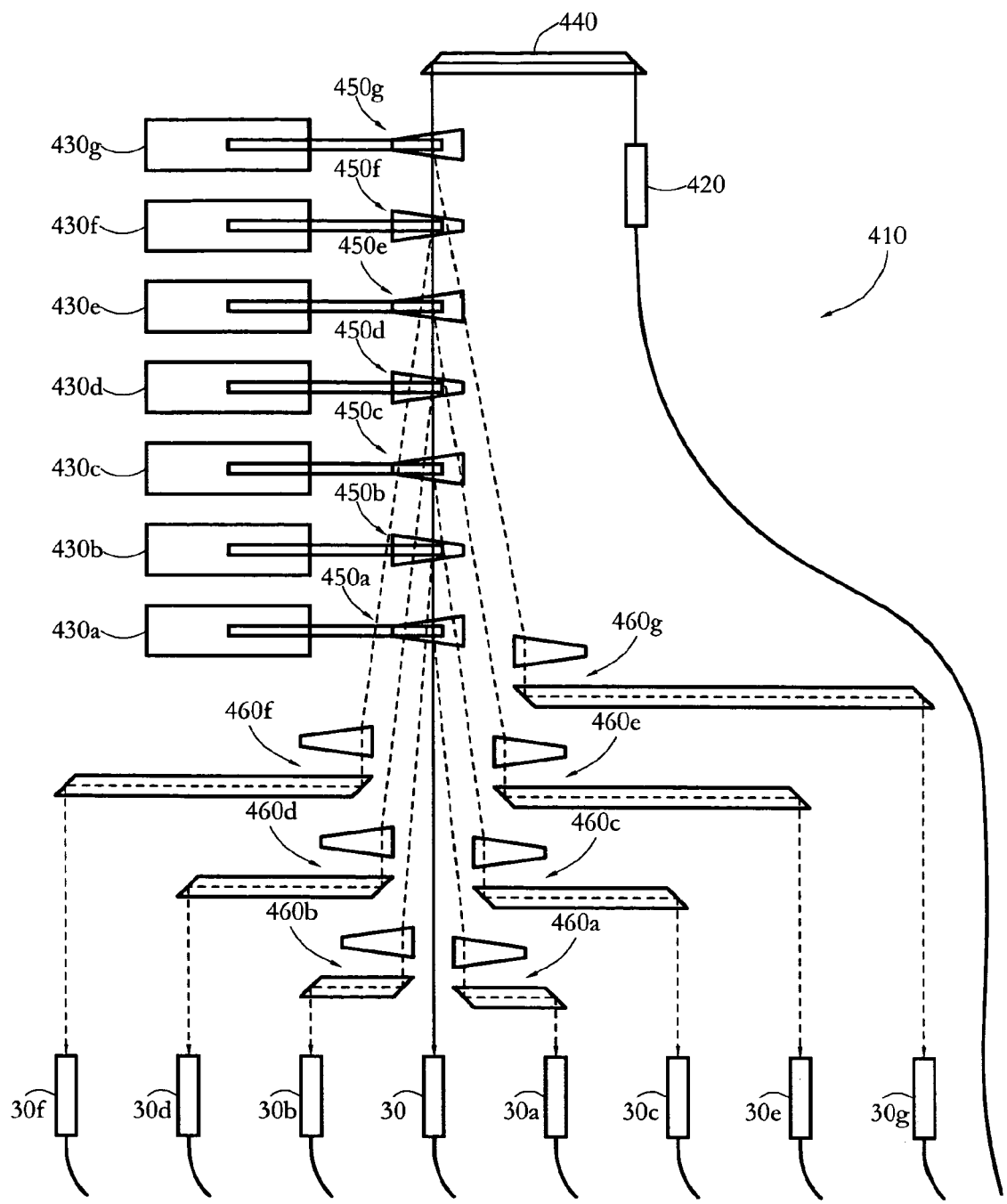
FIG. 8 shows a 1×8 optical switch according to some embodiments of the present invention.

FIG. 8 shows a 1×8 optical switch 410 according to some embodiments of the present invention. Switch 410 includes an input collimator 420, eight output collimators 30, 30a–g, a dovetail prism 440, seven switching wedge prisms 430a–g, and seven transverse translation assemblies 460a–g each including a wedge prism and a rhomboid prism. Switching prisms 430a–g are arranged sequentially along a longitudinal direction, and are oriented in alternating opposite directions. When all switching prisms 430a–g are retracted, collimators 420 and 30 are optically coupled. When switching prisms 430a–g are sequentially inserted, one at a time, into the optical path of the light beam output by collimator 420, the light beam is deflected by the inserted switching prism 430a–g and a corresponding translation assembly 460a–g into a corresponding output collimator 30a–g. Similar 1×N switches with N lower or higher than 8 can be constructed, with N−1 movable switching prisms and N−1 transverse translation assemblies arranged as illustrated in FIG. 8.

If the switching wedge prisms are arranged alternately in opposite orientations, as shown in FIG. 8, beams deflected by adjacent prisms are diverted to opposite sides of the switch longitudinal axis. Such an alternating-orientation design allows the use of wedge prisms having a relatively small deflection angle δ (within a few degrees), which allows improved switching stability, while maintaining sufficient separation between parallel adjacent deflected beams to avoid cross talk. A separation s between parallel adjacent deflection beams obeys the relation:

$$s = D \sin \delta, \qquad [4]$$

where D is the longitudinal separation between the movable wedge prisms corresponding to the two beams. A minimum inter-beam separation s can be determined by the beam's diameter plus a safety margin. In a switch configured with alternating wedge prism orientations, the minimum longitudinal separation between switching prisms corresponding to parallel deflected beams is twice the minimum separation between adjacent switching prisms. The minimum separation between adjacent switching prisms can be determined by the size of the mechanical switching device, for example. To maintain a given inter-beam separation s, a doubling in the size of the inter-prism longitudinal separation D allows reducing sin δ in half, which allows achieving improved stability. The alternating-orientation configuration of FIG. 8 allows increasing the longitudinal separation D between prisms corresponding to parallel beams, relative to a configuration using prisms in a single orientation, shown in FIG. 9.

Figure 9:
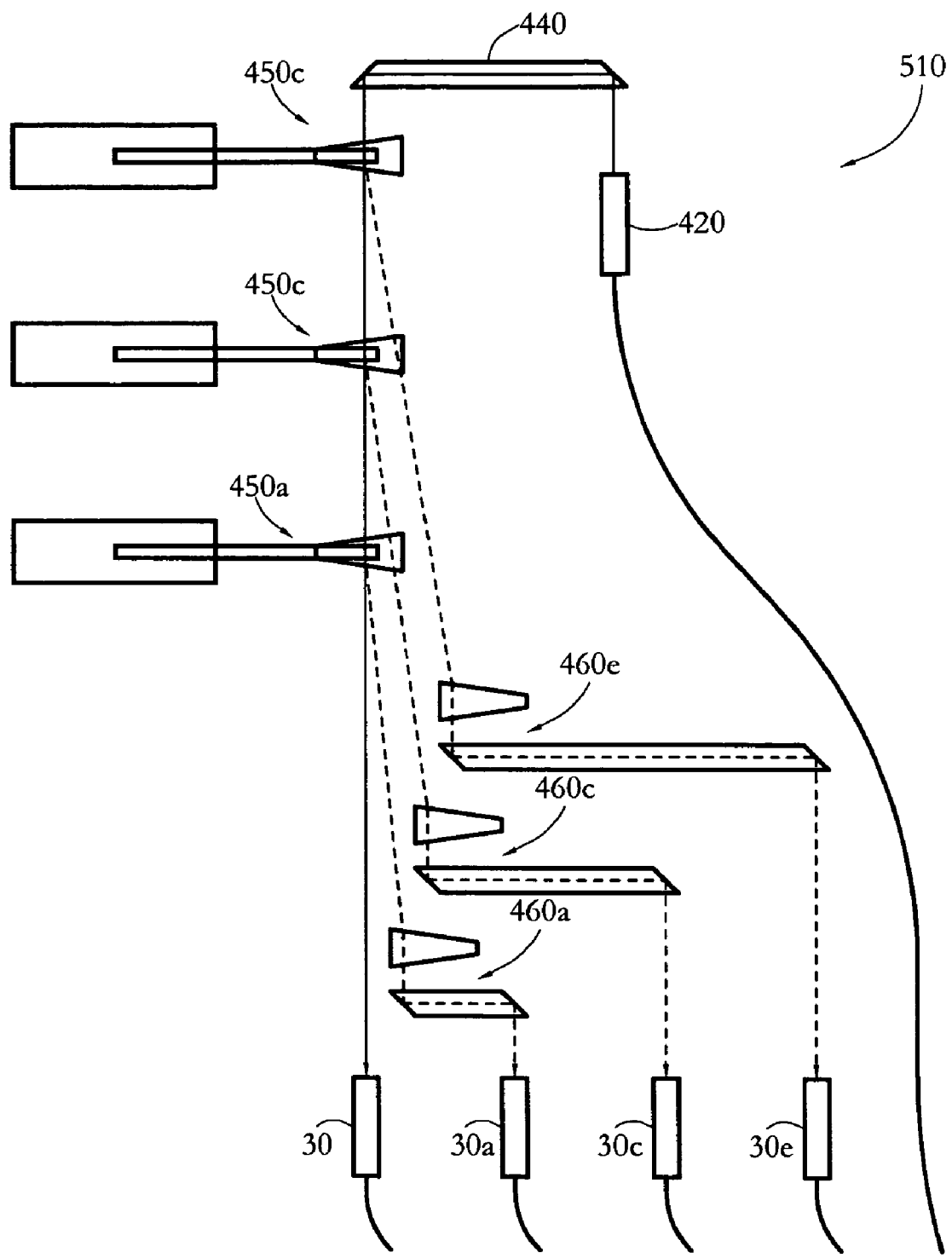
FIG. 9 shows an optical switch having all output collimators positioned on one side of a central longitudinal channel, according to some embodiments of the present invention.

FIG. 9 shows a 1×4 optical switch 510 having a set of wedge prisms 450a, c, e oriented in the same direction, according to some embodiments of the present invention. Wedge prisms 450a, c, e deflect an input light beam on the same side of the switch longitudinal axis, toward translation assemblies 460a, c, e, respectively, which in turn direct the light beam to output collimators 30a, c, e, respectively. To achieve a desired level of separation between adjacent parallel beams, a switch in configuration of FIG. 9 may use larger longitudinal separations between adjacent switching prisms than a switch in the alternating-orientation configuration of FIG. 8.

The preferred optical switch designs described above allow achieving high switching stabilities in environmental conditions subject to vibrations and/or relatively wide temperature variations. A change in the position or orientation of a small-angle wedge prism has a relatively small effect on the translational position and angular orientation of the deflected light beam. In a switch built as shown in FIG. 7, an output power switching repeatability of 0.02 dB was achieved. A maximum insertion loss of 0.6 dB was readily achieved for all ports in switches built as described above. Each input/output optical coupling can be adjusted independently, which allows achieving small insertion losses for all ports. The functioning of the wedge switching prisms is relatively insensitive to geometric parameters of the switching prisms other than the wedge angle, which may allow the use of switching prisms with relaxed tolerances for parameters other than the wedge angle, and thus lower part costs.

It will be clear to one skilled in the art that the above embodiments may be altered in many ways without departing from the scope of the invention. For example, in some embodiments, the pair of reflectors provided by a rhomboid prism can be provided by two physically-separate, fixed reflectors formed by prisms or mirrors. The direction of light travel in the configurations described above can be reversed. A N×M switch can be constructed by concatenating all or the internal parts of a 1×N and a M×1 switch as described above. The switching prisms can be retracted out of the optical path in a linear trajectory, or by a rotary arm movable in-plane or out-of-plane, among others. Accordingly, the scope of the invention should be determined by the following claims and their legal equivalents.

What is claimed is:

1. An optical switch comprising:
   a first optical port;
   a plurality of second optical ports; and
   a plurality of switching units each capable of selectively optically coupling the first optical port to a selected second optical port, each switching unit comprising:
   a fixed, transverse-translation rhomboid prism optically coupled to the selected second optical port; and
   an individually-retractable wedge switching prism movable between a first switching position situated in a generally-longitudinal optical path, and a retracted second switching position situated outside the longitudinal optical path, wherein
   the wedge switching prism in the first switching position deflects light traveling generally along the longitudinal optical path to optically couple the first optical port to the selected second optical port through the transverse-translation prism, and
   the wedge switching prism in the second switching position does not optically couple the first optical port to the selected second optical port.

2. The optical switch of claim 1, wherein said each switching unit further comprises a fixed reverse-deflection wedge prism positioned optically between the transverse-translation prism and the wedge switching prism in the first switching position, the reverse-deflection wedge prism being oriented to impart a deflection opposite in sign to a deflection imparted by the wedge switching prism in the first switching position.

3. The optical switch of claim 1, wherein adjacent wedge switching prisms of different switching units are oppositely oriented to impart deflections of opposite sign to light traveling generally along the longitudinal optical path.

4. The optical switch of claim 1, wherein the wedge switching prism has a wedge angle α less than or equal to 15°.

5. The optical switch of claim 1, wherein each of the plurality of second optical ports and the first optical port includes a fiber collimator coupled to an optical fiber.

6. The optical switch of claim 1, wherein the first optical port and the plurality of second optical ports face a common direction within the optical switch.

7. The optical switch of claim 1, further comprising a third, default optical port optically coupled to the first optical port when the plurality of switching units are not optically coupled to the first optical port.

8. The optical switch of claim 1, wherein the plurality of switching units includes at least three switching units.

9. An optical switch comprising:
a first optical port;
a second optical port;
a third optical port;
a first fixed transverse-translation reflector;
a second fixed transverse-translation reflector;
a first wedge switching prism movable between a first switching position and a second switching position, wherein
the first wedge switching prism in the first switching position deflects generally-longitudinal light to optically couple the first optical port to the second optical port through the first transverse-translation reflector, and
the first wedge switching prism in the second switching position does not optically couple the first optical port to the second optical port;
a second wedge switching prism movable between a third switching position and a fourth switching position, wherein
the second wedge switching prism in the third switching position deflects generally-longitudinal light to optically couple the first optical port to the third optical port through the second transverse-translation reflector, and
the second wedge switching prism in the fourth switching position does not optically couple the first optical port to the third optical port.

10. The optical switch of claim 9, further comprising a fixed reverse-deflection wedge prism positioned optically between the first transverse-translation reflector and the first wedge switching prism in the first switching position, the reverse-deflection wedge prism being oriented to impart a deflection opposite in sign to a deflection imparted by the first wedge switching prism in the first switching position.

11. The optical switch of claim 9, wherein the first wedge switching prism and the second wedge switching prism are longitudinally adjacent and oppositely oriented to impart deflections of opposite sign.

12. The optical switch of claim 9, wherein the first wedge switching prism has a wedge angle α less than or equal to 15°.

13. The optical switch of claim 9, wherein each of the first optical port, the second optical port, and the third optical port includes an optical fiber and a fiber collimator coupled to the optical fiber.

14. The optical switch of claim 9, wherein the first optical port, the second optical port and the third optical port face a common direction within the optical switch.

15. The optical switch of claim 9, further comprising a fourth, default optical port optically coupled to the first optical port when first wedge switching prism is in the second switching position and the second wedge switching prism is in the fourth switching position.

16. An optical switching method comprising:
inserting a first wedge switching prism into a longitudinal light path to establish an optical connection between a first optical port and a second optical port through a first fixed transverse-translation reflector facing the second optical port; and
removing the first wedge switching prism from the longitudinal path and inserting a second wedge switching prism into the longitudinal light path to establish an optical connection between the first optical port and a third optical port through a second fixed transverse-translation reflector facing the third optical port.

17. The optical switching method of claim 16, further comprising employing a reverse-deflection wedge prism to impart a reverse deflection on a light beam establishing the optical connection between the first optical port and the second optical port, the reverse deflection having an opposite sign to a deflection imparted to the light beam by the first wedge switching prism.

18. The optical switching method of claim 16, wherein the first switching prism and the second switching prism are longitudinally adjacent and impart deflections of opposite sign to light traveling generally along the longitudinal optical path.

19. The optical switching method of claim 16, further comprising removing the first wedge switching prism and the second wedge switching prism from the longitudinal optical path to establish a default non-switched connection between the first optical port and a third optical port.

20. An optical switch comprising:
means for inserting a first wedge switching prism into a longitudinal light path to establish an optical connection between a first optical port and a second optical port through a first fixed transverse-translation reflector facing the second optical port; and
means for removing the first wedge switching prism from the longitudinal path and inserting a second wedge switching prism into the longitudinal light path to establish an optical connection between the first optical port and a third optical port through a second fixed transverse-translation reflector facing the third optical port.

* * * * *